(12) United States Patent
Hwang et al.

(10) Patent No.: US 10,599,910 B2
(45) Date of Patent: Mar. 24, 2020

(54) METHOD AND APPARATUS FOR FINGERPRINT RECOGNITION

(71) Applicant: ELECTRONICS AND TELECOMMUNICATIONS RESEARCH INSTITUTE, Daejeon (KR)

(72) Inventors: Jung Yeon Hwang, Daejeon (KR); Seok Hyun Kim, Daejeon (KR); Soo Hyung Kim, Daejeon (KR); Seung-Hyun Kim, Daejeon (KR); Youngsam Kim, Daejeon (KR); Hyung-Kyun Kim, Yongin (KR); Jong-Hyouk Noh, Daejeon (KR); Sangrae Cho, Daejeon (KR); Young Seob Cho, Daejeon (KR); Jin-Man Cho, Daejeon (KR); Seung Hun Jin, Daejeon (KR); Seyoung Huh, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 99 days.

(21) Appl. No.: 15/799,867

(22) Filed: Oct. 31, 2017

(65) Prior Publication Data
US 2018/0144169 A1    May 24, 2018

(30) Foreign Application Priority Data

Nov. 24, 2016 (KR) .................. 10-2016-0157726
Aug. 30, 2017 (KR) .................. 10-2017-0110442

(51) Int. Cl.
*G06K 9/00*    (2006.01)
*G06F 21/32*    (2013.01)

(52) U.S. Cl.
CPC .............. *G06K 9/001* (2013.01); *G06F 21/32* (2013.01); *G06K 9/0008* (2013.01)

(58) Field of Classification Search
CPC ....... G06K 9/001; G06K 9/0008; G06F 21/32
See application file for complete search history.

(56) References Cited

U.S. PATENT DOCUMENTS

| 4,607,384 | A | * | 8/1986 | Brooks ............. G07C 9/00158 382/124 |
| 4,944,021 | A | | 7/1990 | Hoshino et al. |
| 5,960,101 | A | * | 9/1999 | Lo ...................... G06K 9/00087 382/124 |
| 6,266,433 | B1 | | 7/2001 | Bolle et al. |
| 7,035,444 | B2 | | 4/2006 | Kunieda et al. |

(Continued)

FOREIGN PATENT DOCUMENTS

| KR | 10-2004-0078290 A | 9/2004 |
| KR | 10-0497226 B1 | 6/2005 |

*Primary Examiner* — Amara Abdi (57) ABSTRACT

A method and an apparatus for fingerprint recognition are disclosed. The apparatus for the fingerprint recognition may extract a plurality of fingerprint feature points from a fingerprint image and may predetermine a group among the plurality of fingerprint feature points. The apparatus for the fingerprint recognition may also calculate a ridge number between the first fingerprint feature points included in the group and may use the ridge number to generate a ridge count sequence.

11 Claims, 6 Drawing Sheets

(56) References Cited

U.S. PATENT DOCUMENTS

| | | | |
|---|---|---|---|
| 7,151,846 B1* | 12/2006 | Fujii | G06K 9/00067 |
| | | | 382/125 |
| 8,699,799 B2 | 4/2014 | Moon et al. | |
| 2002/0061125 A1* | 5/2002 | Fujii | G06K 9/00067 |
| | | | 382/125 |
| 2002/0181749 A1* | 12/2002 | Matsumoto | G06K 9/00006 |
| | | | 382/125 |
| 2008/0101663 A1* | 5/2008 | Lo | G06K 9/0008 |
| | | | 382/124 |
| 2009/0267735 A1 | 10/2009 | Kim et al. | |
| 2012/0195475 A1* | 8/2012 | Abiko | G06T 7/00 |
| | | | 382/115 |
| 2018/0289292 A1* | 10/2018 | Morris | A61B 5/726 |

* cited by examiner

| Division | | 1 | 2 | 3 | 4 | 5 | 6 | 7 | 8 | 9 | 10 | 11 |
|---|---|---|---|---|---|---|---|---|---|---|---|---|
| Registration | R-RCS1 | B1 | B2 | B3 | B4 | B5 | B6 | B7 | B8 | B9 | B10 | B11 |
| | | 2 | 5 | 8 | 6 | 3 | 2 | 1 | 4 | 3 | 5 | 7 |
| Authentication | A-RCS1 | C1 | C2 | C3 | C4 | C5 | C6 | C7 | C8 | C9 | C10 | C11 |
| | | 6 | 2 | 2 | 1 | 4 | 3 | 5 | 7 | 1 | 5 | 8 |

| | | B1 | B2 | B3 | B4 | B5 | B6 | B7 | B8 | B9 | B10 | B11 |
|---|---|---|---|---|---|---|---|---|---|---|---|---|
| | | 2 | 5 | 8 | 6 | 3 | 2 | 1 | 4 | 3 | 5 | 7 |
| C1 | 6 | | | | | | 0 | | | | | |
| C2 | 2 | 0 | | | | 0 | | | | | | |
| C3 | 2 | 0 | | | | 0 | | | | | | |
| C4 | 1 | | | | | | | 0 | | | | |
| C5 | 4 | | | | | | | | 0 | | | |
| C6 | 3 | | | | 0 | | | | | 0 | | |
| C7 | 5 | | | | | | | | 0 | | | |
| C8 | 7 | | | | | | | | | | | |
| C9 | 1 | | | | | | | 0 | | | | |
| C10 | 5 | | 0 | | | | | | | 0 | | |
| C11 | 8 | | | 0 | | | | | | | | |

FIG. 6

METHOD AND APPARATUS FOR FINGERPRINT RECOGNITION

CROSS-REFERENCE TO RELATED APPLICATION

This application claims priority to and the benefit of Korean Patent Application No. 10-2017-0110442 and 10-2016-0157726 filed in the Korean Intellectual Property Office on Aug. 30, 2017 and Nov. 24, 2016, the entire contents of which are incorporated herein by reference.

BACKGROUND OF THE INVENTION (a) Field of the Invention

The present invention relates to a method and an apparatus for fingerprint recognition.

(b) Description of the Related Art

A biometric recognition technology using fingerprint information has been researched for a long period of time and various methods are known. A fingerprint refers to a shape created based on a line in which a sweat gland of a skin at the tip of the finger is raised, that is, a ridge. A depressed part between ridges is referred to as a valley. Overall, the ridge may be formed along a constant path and may be divided into a bow pattern, a swirl pattern, a horseshoe pattern, and the like. The shape of the fingerprint is different for every person, and it has been actively researched as a unique biometric recognition means until recently.

As basic feature information for the fingerprint recognition, two points based on local features of the ridge pattern are considered. These two points are an ending point where the ridge is interrupted and a bifurcation point where the line is branched. In detail, general feature information for the fingerprint recognition are expressed by coordinate values x and y on the fingerprint image of the points, an angle θ of the ridge of each point, and a characteristic bit information value b representing whether the point is the bifurcation point or the ending point. These contents are already widely known to international standards such as ISO/IEC 19794.

Basically, biometric information is influenced by many environmental variables, so the same biological image may not be acquired every time. In the case of the fingerprints, different fingerprint images may be obtained each time because of non-uniform pressure from a user, rotation deformation, and foreign material insertion, such as sweat or dust, when using a fingerprint authentication system. As a result, a geometric deformation occurs in the extracted feature information, thereby making it difficult to achieve an adequate recognition rate.

In order to design a fingerprint recognition system that is strong to the geometric deformation of the fingerprint image, a method to utilize the number of ridges has been researched. The ridges may exist and the number of ridges may be defined between arbitrary feature points in one fingerprint image. The number of ridges does not change even if the valley interval changes on the fingerprint image by the external pressure, and the number of ridges between two feature points does not change when the rotated image is scanned. In this way, the number information of the ridges may be used as invariant feature information even if the geometric deformation of the image occurs. As a patent for the fingerprint recognition system using the number of ridges, there are U.S. Pat. Nos. 4,944,021, 6,266,433, and Korean publication No. 10-2004-0078290, etc.

Since the number of ridges is calculated based on a certain feature point, the deformation for the flow of the ridges or the inserting, the deletion, the movement, or the like of the feature points must be considered in the fingerprint recognition using the number information of the ridges. The conventional methods only use the ridge number information between specific feature points according to reference points, a certain range, or a constant rule for the fingerprint recognition. As a result, the conventional methods are vulnerable to insertion, deletion, movement, or the like of the feature points. For example, U.S. Pat. No. 4,944,021 proposes a method of defining ridge number values between reference feature points and feature points existing in each quadrant as one group, and searching for a group that is similar to the group. However, there is a problem that a match is impossible when the direction of the reference feature points is rotated or the reference feature points are not displayed when scanning the fingerprint image.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a method and an apparatus for fingerprint recognition capable of performing fingerprint recognition even with a change of fingerprint feature points.

According to an exemplary embodiment of the present invention, a method of performing fingerprint recognition by using a fingerprint image scanned by a fingerprint recognition apparatus is provided. The method includes: extracting a plurality of fingerprint feature points in the fingerprint image; determining a predetermined group among the plurality of fingerprint feature points; calculating a ridge number between a first fingerprint feature points included in the group; and generating a ridge count sequence by using the ridge number.

The calculating includes: setting a reference fingerprint feature point as a reference among the first fingerprint feature points; and calculating a ridge number between the reference fingerprint feature point and the first fingerprint feature points.

The generating may include generating the ridge count sequence between the reference fingerprint feature point and the first fingerprint feature points, by arranging the ridge number calculated in a predetermined direction.

The method may further include performing authentication by using the ridge count sequence.

The performing of the authentication may include performing the authentication by comparing the registration ridge count sequence as the ridge count sequence generated in the registration process and the authentication ridge count sequence as the ridge count sequence generated in the authentication process.

The performing of the authentication may include: disposing the registration ridge count sequence in a first direction on a matrix; disposing the authentication ridge count sequence in a second direction on the matrix; calculating a value difference of the registration ridge count sequence and the authentication ridge count sequence; and calculating a score of a similarity by using a characteristic on which the value difference is disposed on the matrix.

The calculating of the score of the similarity may include calculating the score of the similarity by using the characteristic that a value difference of 0 is continuously disposed in a diagonal on the matrix.

The plurality of fingerprint feature points may include an ending point of the ridge and a bifurcation point of the ridge.

The predetermined direction may be a clockwise direction or a counterclockwise direction.

According to another exemplary embodiment of the present invention, a method of performing fingerprint recognition through a fingerprint recognition apparatus is provided. The method may include: extracting a plurality of first fingerprint feature points on a fingerprint image to be registered; calculating a ridge number between the plurality of first fingerprint feature points to generate a registration ridge count sequence; extracting a plurality of second fingerprint feature points on a fingerprint image to be authenticated; calculating a ridge number between the plurality of second fingerprint feature points to generate an authentication ridge count sequence; and comparing the registration ridge count sequence and the authentication ridge sequence with each other to perform authentication.

The generating of the registration ridge count sequence may include: predetermining a first fingerprint feature point from the plurality of first fingerprint feature points; calculating a ridge number in a predetermined direction between at least one fingerprint feature point among the plurality of first fingerprint feature points and the first fingerprint feature point; and arranging the ridge number calculated in the predetermined direction to generate the registration ridge count sequence.

The generating of the authentication ridge count sequence may include: predetermining a first fingerprint feature point from the plurality of second fingerprint feature points; calculating a ridge number in a predetermined direction between the plurality of second fingerprint feature points and the first fingerprint feature point; and arranging the ridge number calculated in the predetermined direction to generate the authentication ridge count sequence.

The performing of the authentication may include: disposing the registration ridge count sequence in a first direction on a matrix; disposing the authentication ridge count sequence in a second direction on the matrix; calculating a value difference of the registration ridge count sequence and the authentication ridge count sequence; and performing the authentication by using a characteristic that the value difference is disposed on the matrix.

The disposing in the first direction may include consecutively disposing the registration ridge count sequence in the first direction twice, and the disposing in the second direction may include consecutively disposing the authentication ridge count sequence in the second direction twice.

According to another exemplary embodiment of the present invention, a fingerprint recognition apparatus is provided. The fingerprint recognition apparatus includes: a scan unit scanning a fingerprint of a target to be recognized to generate a fingerprint image; and a controller extracting a plurality of fingerprint feature points from the fingerprint image, calculating a ridge number between the plurality of fingerprint feature points, and generating a ridge count sequence by using the ridge number.

The controller may predetermine a reference fingerprint feature point as a reference among the plurality of fingerprint feature points, and calculates a ridge number between the reference fingerprint feature point and the plurality of fingerprint feature points.

The controller may arrange the ridge number calculated in a predetermined direction between the reference fingerprint feature point and the plurality of fingerprint feature points to generate the ridge count sequence.

The fingerprint image may include the registration fingerprint image scanned in the registration process and the authentication fingerprint image scanned in the authentication process, and the controller may compare the registration ridge count sequence as the ridge count sequence corresponding to the registration fingerprint image and the authentication ridge count sequence as the ridge count sequence corresponding to the authentication fingerprint image with each other to perform the authentication.

The controller may dispose the registration ridge count sequence and the authentication ridge count sequence in different directions on a matrix, may calculate a value difference of the registration ridge count sequence and the authentication ridge count sequence, and may perform the authentication by using a characteristic that the value difference is disposed on the matrix.

The plurality of fingerprint feature points may be an ending point of the ridge or a bifurcation point of the ridge, and the predetermined direction is a clockwise direction or a counterclockwise direction.

According to an exemplary embodiment of the present invention, the ridge count sequence is generated to be used for the fingerprint authentication, thereby further increasing accuracy of the fingerprint recognition.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

A method and an apparatus for fingerprint recognition according to an exemplary embodiment of the present invention performs fingerprint recognition by calculating ridge numbers between one fingerprint feature point and different fingerprint feature points selected in a predetermined direction and using sequences in which values of the ridge numbers are arranged. The method and the apparatus for the fingerprint recognition according to an exemplary embodiment of the present invention will be described in detail below.

Figure 1:
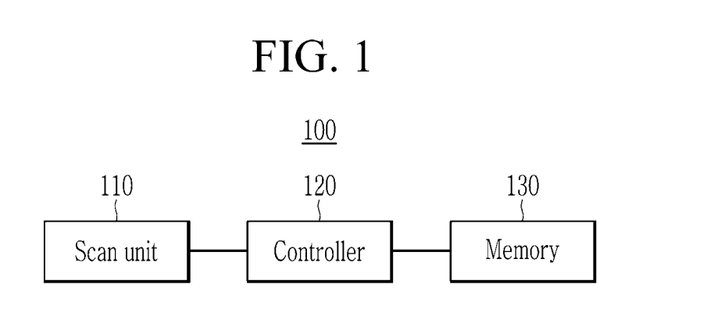
FIG. 1 is a block diagram showing a fingerprint recognition apparatus according to an exemplary embodiment of the present invention.

FIG. 1 is a block diagram showing a fingerprint recognition apparatus 100 according to an exemplary embodiment of the present invention.

As shown in FIG. 1, a fingerprint recognition apparatus 100 according to an exemplary embodiment of the present invention includes a scan unit 110, a controller 120, and a memory 130.

The scan unit 110 scans a fingerprint of a target to be recognized to generate a fingerprint image. That is, the scan unit 110 scans the fingerprint of the target to be recognized through a fingerprint recognition sensor to generate the fingerprint image. The method of scanning the fingerprint image through the scan unit 110 may be known to a person having usual knowledge of the technical field to which the present invention belongs, so a concrete explanation of the art is omitted. The scan unit 110 provides the scanned fingerprint image to the controller 120. The fingerprint image generation is performed in a process of registering the fingerprint of the scan unit 110 and a process of authenticating the fingerprint.

Figure 2:
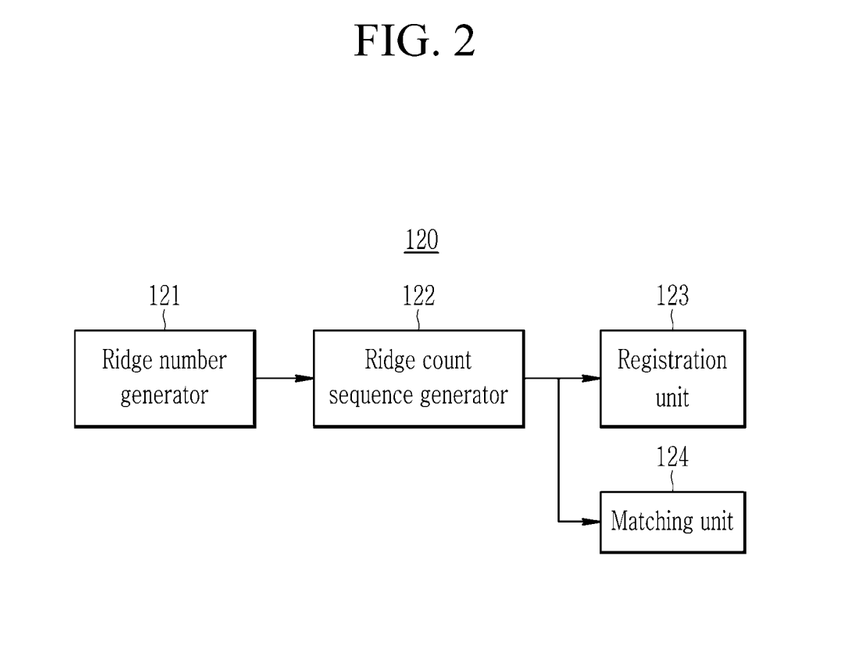
FIG. 2 is a block diagram showing a configuration of a controller 120 according to an exemplary embodiment of the present invention.

The controller 120 performs the registration process and the authentication process by using the fingerprint image generated from the scan unit 110. FIG. 2 is a block diagram showing a configuration of a controller 120 according to an exemplary embodiment of the present invention. As shown in FIG. 2, the controller 120 according to an exemplary embodiment of the present invention includes a ridge number generator 121, a ridge count sequence generator 122, a registration unit 123, and a matching unit 124.

The process in which the controller 120 registers the fingerprint image will be described as follows. The controller 120 receives the fingerprint image (hereinafter referred to as 'a registration fingerprint image') to be registered through the scan unit 110, and performs a ridge number extract, ridge count sequence generation, and a registration process by using the registration fingerprint image. The ridge number generator 121 of the controller 120 applies an algorithm for extracting a ridge number from the registration fingerprint image to calculate a ridge number value. Also, the ridge count sequence generator 122 of the controller 120 generates a ridge count sequence RCS by using the ridge number values. The registration unit 123 of the controller 120 registers the information for the ridge count sequence RCS to the memory 130 for later authentication of the user. Here, the ridge count sequence RCS may be stored and managed based on a security policy after being encrypted.

The process in which the controller 120 authenticates the fingerprint image will be described as follows. The controller 120 receives the fingerprint image (hereinafter referred to as 'an authentication fingerprint image') to be authenticated through the scan unit 110, and performs a process of a ridge number extract, ridge count sequence generation, similarity matching to the registered information, and a matching result report by using the authentication fingerprint image. In detail, the ridge number generator 121 of the controller 120 applies the algorithm for extracting the ridge number from the authentication image to calculate the ridge number value. Also, the ridge count sequence generator 122 of the controller 120 calculates the ridge count sequence RCS according to a predetermined rule by using the ridge number value. The matching unit 124 of the controller 120 compares the ridge count sequence stored in the memory 124 in the registration process and the ridge count sequence generated in the authentication process. The matching unit 124 may report the comparison result to the outside. On the other hand, the ridge count sequence that is encrypted depending on the security policy is decoded to be used in the comparison and matching processes. Also, the ridge count sequences in the encryption state may be used in the comparison and matching processes.

Figure 3:
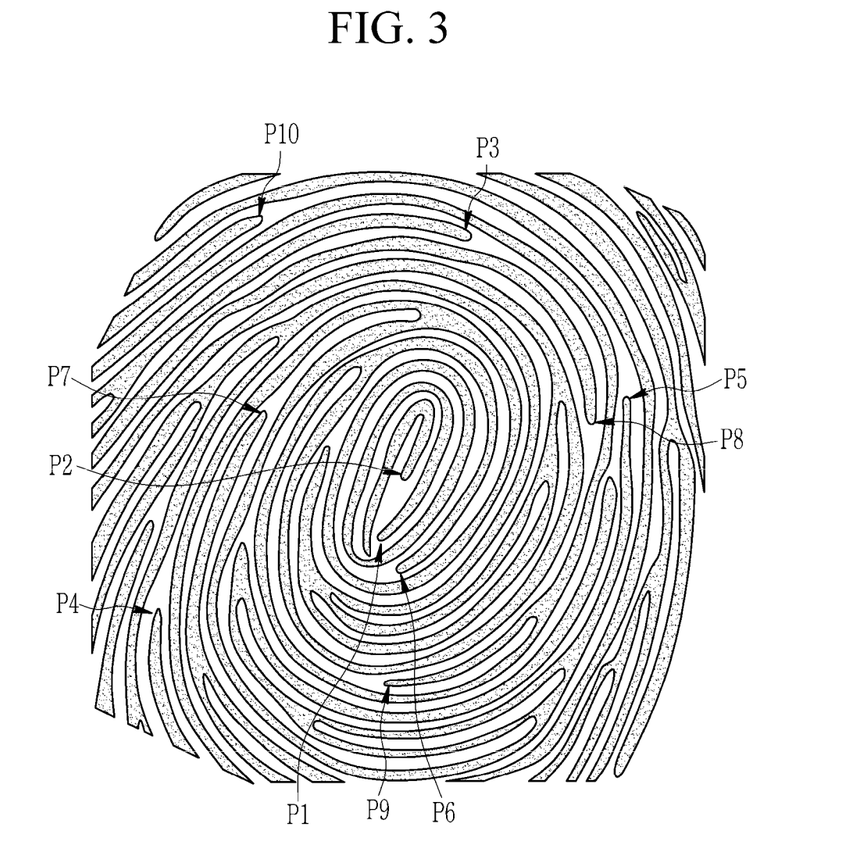
FIG. 3 is a view showing a method in which a controller generates a ridge count sequence according to an exemplary embodiment of the present invention.

FIG. 3 is a view showing a method in which a controller 120 generates a ridge count sequence according to an exemplary embodiment of the present invention.

A below-described function of calculating the number of ridges is represented by an RC (Ridge Count). The ridge number between the fingerprint feature points may be expressed as an integer value. When the number of ridges between two fingerprint feature points P1 and P2 is three, it may be expressed as RC(P1, P2)=3.

On the other hand, to configure (generate) the ridge count sequence, it is necessary to define a group for the fingerprint feature points for a predetermined fingerprint feature point (i.e., the ending point or the bifurcation point). Also, to configure the ridge count sequence, it is necessary to define a fingerprint feature point to be a reference (hereinafter 'a reference fingerprint feature point') in the group of the fingerprint feature points. The controller 120 calculates the ridge number value between the reference fingerprint feature point and the fingerprint feature points included in the group of the fingerprint feature points. The group of fingerprint feature points may be variously configured by considering several conditions such as the characteristics (for example, the shape of the ending point or the bifurcation point) and the ridge number. The ridge number between the same points when configuring the sequence may be excluded, however the ridge number between the same points may be selectively included in the sequence if necessary.

Firstly, to define the ridge count sequence, a case considering the characteristic information (the shape of the ending point or the bifurcation point) of the fingerprint feature points will be described. As explained in the background art, the fingerprint feature points may be divided into the ending point and the bifurcation point. To configure the ridge count sequence, the group of the fingerprint feature points may only be configured of the ending points (or the bifurcation points), or may be configured by appropriately mixing the ending points and the bifurcation points.

A group {Q1, Q2, Q3, Q4} configured of the ending points on the fingerprint image is represented as the group of the fingerprint feature points, and the ridge count sequence for the fingerprint feature point P1 may be defined by B1'=RC(P1,Q1), B2'=RC(P1,Q2), B3'=RC(P1,Q3), B4'=RC(P1,Q4). Similarly, the configuration of the ridge count sequence is possible for the group configured of the bifurcation point of the fingerprint image. Also, for n fingerprint feature points including both of the bifurcation point and the ending point, the ridge count sequence may be defined between the fingerprint feature point P1 and other fingerprint feature points. If the group of the n fingerprint feature points is expressed by {P1, P2, . . . , Pn}, the ridge count sequence for the fingerprint feature point P1 may be represented by B1=RC(P1,P2), B2=RC(P1,P3), B3=RC(P1,P4), . . . Bn-1=RC(P1,Pn). In these examples, P1 becomes a reference fingerprint feature point.

As another example to define the group of the fingerprint feature points, the size of the ridge number may be considered. As one example, it may be assumed that it is effective only when the size of the ridge number is in a predetermined range. For example, it is assumed that the ridge number between the fingerprint feature point P1 and the fingerprint feature points P2, P3, P4, P5, and P6 is calculated like 3=RC(P1,P2), 8=RC(P1,P3), 4=RC(P1,P4), 7=RC(P1,P5), 2=RC(P1,P6). In this case, if it is assumed that only the ridge number value is effective as the value of 3 to 7 to configure the ridge count sequence, the ridge count sequence is configured of 3=RC(P1,P2), 4=RC(P1,P4), 7=RC(P1,P5).

In the configuration (generation) of this ridge count sequence, the starting fingerprint feature point (in the above or below example, Q1 or P2) of the sequence may be determined according to a predetermined rule. As one example, any position may be the starting fingerprint feature point. Also, as another example, the fingerprint feature point positioned most north on the fingerprint image may be a starting fingerprint feature point.

In the configuration (generation) of this ridge count sequence, the fingerprint feature point to calculate the sequence value of the following order of the starting fingerprint feature point may also be determined according to a predetermined rule. As one example, the sequence value of the following order may be the value of the ridge number between the fingerprint feature point positioned in a clockwise direction or a counterclockwise direction from the starting fingerprint feature point on the fingerprint image and the reference fingerprint feature point.

If the method of generating the ridge count sequence explained above is applied to FIG. 3, it is as follows. In FIG. 3, the ending point among the fingerprint feature points is assumed to be the group of the fingerprint feature point. Accordingly, the group of the fingerprint feature point is Z={P1, P2, P3, P4, P5, P6, P7, P8, P9, P10}. Also, it is assumed that P2 is the reference fingerprint feature point, and it is assumed that the fingerprint feature point positioned most north in the fingerprint image is the starting fingerprint feature point. In addition, it is assumed that the following fingerprint feature point is the clockwise direction.

In FIG. 3, the fingerprint feature point (which is the ending point) disposed most north from the reference fingerprint feature point P2 is P3. The ridge number between P2 and P3 is 9=RC (P2, P3) such that the first value of the ridge count sequence becomes 9. The following fingerprint feature point (which is an ending point) in the clockwise direction with respect to P2 based on P3 is P5. The ridge number between P2 and P5 is 10=RC (P2, P5) such that the second value of the ridge count sequence becomes 10. The following fingerprint feature point in the clockwise direction with respect to P2 based on P5 is P8. The ridge number between P2 and P8 is 8=RC (P2, P8) such that the third value of the ridge count sequence becomes 8. The following fingerprint feature point in the clockwise direction with respect to P2 based on P8 is P6. The ridge number between P2 and P6 is 3=RC (P2, P6) such that the fourth value of the ridge count sequence becomes 3. The following fingerprint feature point in the clockwise direction with respect to P2 based on P6 is P9. The ridge number between P2 and P9 is 8=RC (P2, P9) such that the fifth value of the ridge count sequence becomes 8. The following fingerprint feature point in the clockwise direction with respect to P2 based on P9 is P1. The ridge number between P2 and P1 is 1=RC (P2, P1) such that the sixth value of the ridge count sequence becomes 1. The following fingerprint feature point in the clockwise direction with respect to P2 based on P1 is P4. The ridge number between P2 and P4 is 11=RC (P2, P4) such that the seventh value of the ridge count sequence becomes 11. The following fingerprint feature point in the clockwise direction with respect to P2 based on P4 is P7. The ridge number between P2 and P7 is 8=RC (P2, P7) such that the eighth value of the ridge count sequence becomes 8. Finally, the following fingerprint feature point in the clockwise direction with respect to P2 based on P7 is P10. The ridge number between P2 and P10 is 13=RC (P2, P10) such that the ninth value of the ridge count sequence becomes 13. Accordingly, the ridge count sequence between the groups Z of the ending points for the reference fingerprint feature point P2 is RC (P2, P3), RC (P2, P5), RC (P2, P8), RC (P2, P6), RC (P2, P9), RC (P2, P1), RC (P2, P4), RC (P2, P7), and RC (P2, P10), and the detailed value is the sequence such as 9, 10, 8, 3, 8, 1, 11, 8, and 13.

The controller 120 according to an exemplary embodiment of the present invention is used for the fingerprint authentication by using the ridge count sequence generated by the above method. That is, the controller 120 generates the ridge count sequence from the registration fingerprint image to be previously registered, generates the ridge count sequence from the authentication fingerprint image, and compares two ridge count sequences with each other to perform the authentication.

Hereinafter, the ridge count sequence generated from the registration fingerprint image is referred to as 'a registration ridge count sequence', and the ridge count sequence generated from the authentication fingerprint image is referred to as 'an authentication ridge count sequence'.

Figure 4:
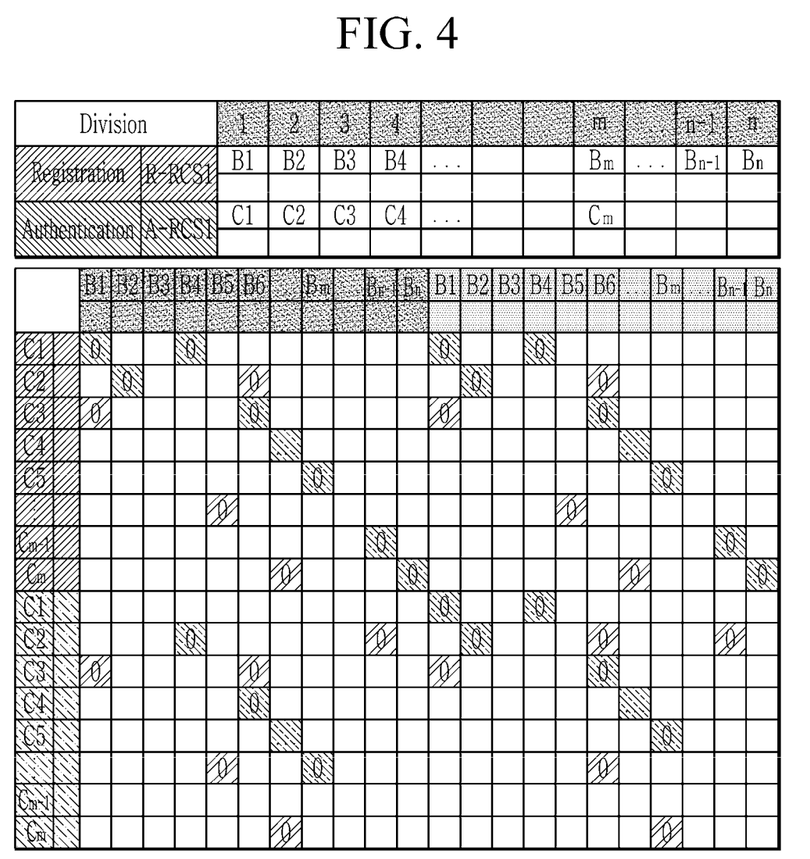
FIG. 4 is a view showing an authentication method of a controller according to an exemplary embodiment of the present invention.

FIG. 4 is a view showing an authentication method of a controller 120 according to an exemplary embodiment of the present invention. The below-described authentication method may be performed in the matching unit 124 of the controller 120. In FIG. 4, the registration ridge count sequence is represented by 'R-RCS1', and the authentication ridge count sequence is represented by 'A-RCS1'.

The controller 120 compares the registration ridge count sequence R-RCS1 and the authentication ridge count sequence A-RCS1 with each other to perform the fingerprint authentication. When the registration fingerprint image and the authentication fingerprint image are obtained from the same user, the partial sequences of the ridge count sequence are similar to each other. The controller 120 according to an exemplary embodiment of the present invention performs the fingerprint authentication by using the similarity of the partial sequences. In FIG. 4, the registration ridge count sequence R-RCS1 is represented by B1, B2, B3, B4, . . . , $B_{n-1}$, $B_n$, and the authentication ridge count sequence A-RCS1s represented by C1, C2, C3, C4, . . . , $C_{m-1}$, $C_m$. On the other hand, the registration ridge count sequence R-CS1 and the authentication ridge count sequence A-RCS1 may have different lengths from each other. In FIG. 4, n≥m is assumed, however m≥n may be applied.

As shown in FIG. 4, the controller 120 duplicates the registration ridge count sequence twice in the row, and duplicates the authentication ridge count sequence twice in the column. The controller 120 calculates and allocates a deviation of two ridge number values in an entry where each row and each column cross each other. FIG. 4 only shows a case that the entry is '0' for convenience of entry. The controller 120 performs the fingerprint authentication by considering a type of the entry in which the deviation shown on the matrix is zero. The controller 120 calculates a length and a frequency for a string of zeros continuously connected on the matrix with the diagonal direction, and uses the calculated values to the fingerprint authentication.

On the other hand, the controller 120 may reflect whether there are several entry values other than zero to the fingerprint authentication between the strings of zeros continuously connected in the diagonal direction on the matrix. When a noise is generated during the fingerprint scan, since the ridge number value may not be correct, the registration ridge count sequence and the authentication ridge count sequence may not match each other. Accordingly, the entry value of the matrix representing the deviation between two sequences (i.e., the registration ridge count sequence and the authentication ridge count sequence) may be the value that is not zero. By reflecting this condition, the controller 120 according to an exemplary embodiment of the present invention may additionally specify a weight value.

Figure 5A:
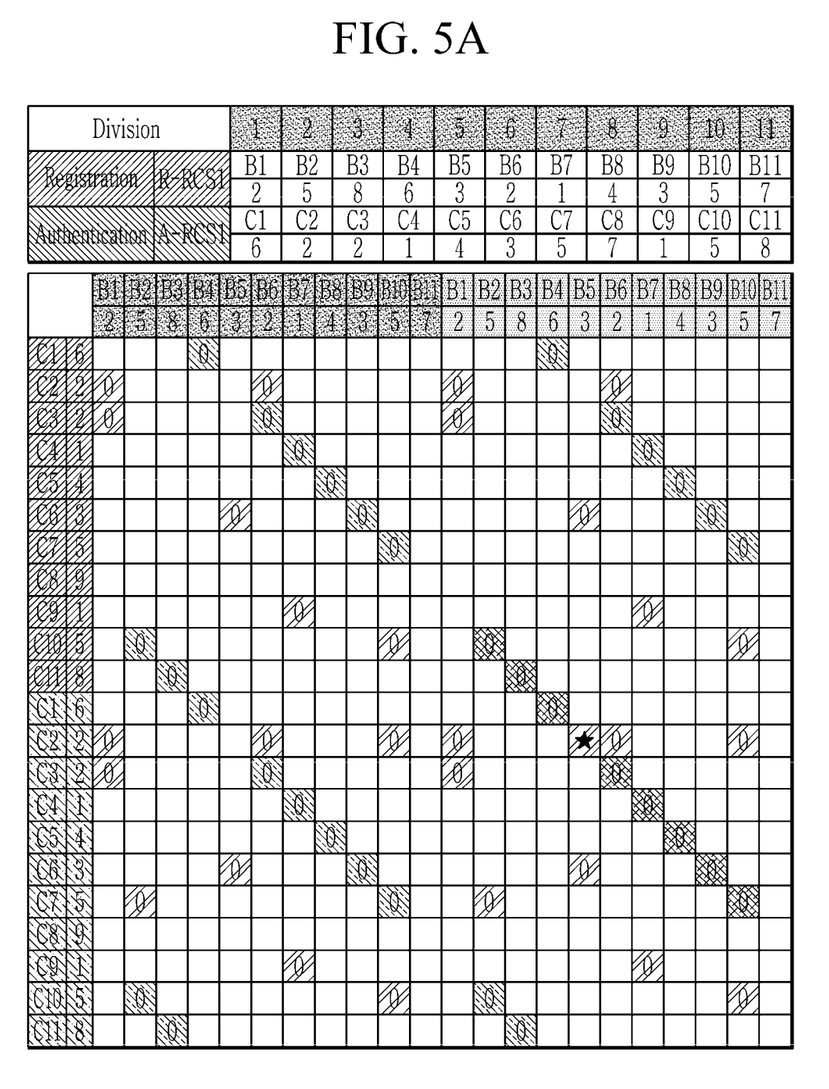
FIG. 5A and FIG. 5B are views showing a method of comparing two ridge count sequences by applying an actual value to a ridge count sequence arrangement of FIG. 4, respectively.
Figure 5B:
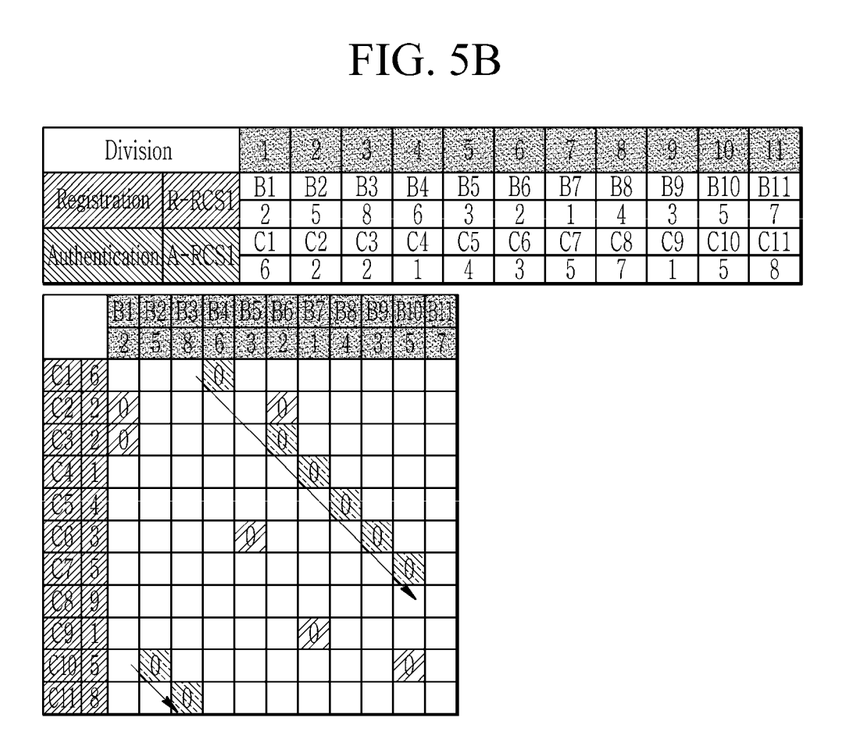

FIG. 5A and FIG. 5B are views showing a method comparing two ridge count sequences by applying an actual value to a ridge count sequence arrangement of FIG. 4, respectively.

In FIG. 5A and FIG. 5B, it is assumed that the registration ridge count sequence is B1=2, B2=5, B3=8, B4=6, B5=3, B6=2, B7=1, B8=4, B9=3, B10=5, and B11=7, and that the authentication ridge count sequence is C1=6, C2=2, C3=2, C4=1, C5=4, C6=3, C7=5, C8=9, C9=1, C10=5, and C11=8. Also, it is assumed that the ridge count sequence is generated in the clockwise direction with the start of the arbitrary fingerprint feature point.

As shown in FIG. 5A, the controller 120 duplicates two ridge count sequences (i.e., the registration ridge count sequence and the authentication ridge count sequence) twice in the row and the column. On the other hand, as shown in FIG. 5B, the controller 120 may display two ridge count sequences (i.e., the registration ridge count sequence and the authentication ridge count sequence) one by one in the row and the column. FIG. 5B is the same FIG. 5A except for displaying two ridge count sequences one by one such that it is described below based on FIG. 5A. Also, the controller 120 represents the value of zero among the deviations of two ridge number values in the entry where each row and column are crossed. Referring to the matrix of FIG. 5A, the diagonal direction sequential 0 column of the length 3 is displayed in one place, and this may be represented by {(B2,C10), (B3,C11), (B4,C1)} as the index of the row and the column. Also, the diagonal direction sequential 0 column of the length 5 is displayed in one place, and this may be represented by {(B6,C3), (B7,C4), (B8,C5), (B9,C6), (B10,C7)} as the index of the row and the column.

On the other hand, the controller 120 may apply a predetermined weight value for each length of the diagonal direction sequential 0 column represented on the matrix to calculate the score for the similarity. For example, the controller 120 may multiply the diagonal direction sequential 0 column of the length 3 by three and the diagonal direction sequential 9 of the length 5 by five.

Here, the weight value may be determined by a statistical distribution depending on the length of the diagonal direction sequential 0 column. The controller 120 determines the similarity of two ridge count sequences based on the calculated score value. On the other hand, in FIG. 5, since one entry value that is not zero exists between the diagonal direction sequential 0 column of the length 3 and the diagonal direction sequential 0 column of the length 5, the controller 120 may take the additional weight value for this case. Also, the controller 120 may take the additional weight value by considering the side of the entry value that is not zero.

Figure 6:
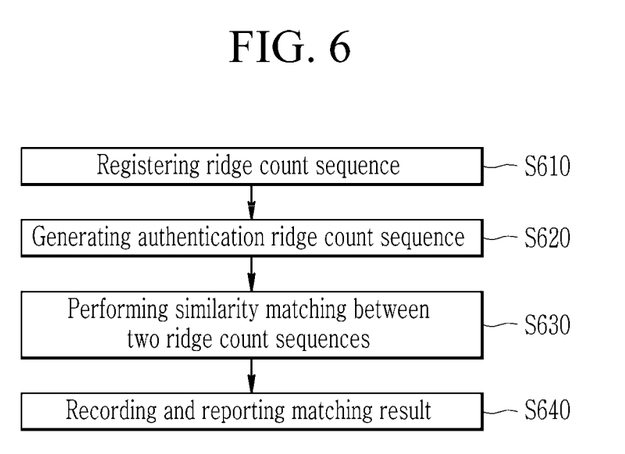
FIG. 6 is a flowchart showing a method of matching a fingerprint based on a comparison method of ridge count sequences through a controller according to an exemplary embodiment of the present invention.

FIG. 6 is a flowchart showing a method of matching a fingerprint based on a comparison method of ridge count sequences through a controller 120 according to an exemplary embodiment of the present invention.

As described above, since the ridge count sequence is defined by the group of the one fingerprint feature point and other fingerprint feature points, the multiple different ridge count sequences may be generated on one fingerprint image. These multiple different ridge count sequences are generated in the registration process and the authentication process.

The controller 120 registers at least one of the ridge count sequences according to the predetermined policy in the registration process (S610). For example, the controller 120 may generate the ridge count sequence for each of the entire fingerprint feature points by using the scanned registration fingerprint image to be registered. Also, as another example, the controller 120 may generate the ridge count sequence for the arbitrarily selected fingerprint feature points.

In addition, the controller 120 generates at least one authentication ridge count sequence according to the predetermined policy in the authentication process (S620). For example, the controller 120 may generate the ridge count sequence for each of the entire fingerprint feature points by using the scanned authentication fingerprint image.

The controller 120 performs the similarity matching by comparing the registration ridge count sequence registered in the step (S610) and the authentication ridge count sequence generated in the steps (S620) and (S630). That is, the controller 120 calculates the similarity between the ridge count sequences by using the comparison method described in FIG. 4 and FIG. 5. For example, when comparing the two ridge count sequences in which there is no similarity at all, the frequency of displaying the diagonal direction sequential 0 column of the specific length will be very low. Also, the score (the calculation value) of the similarity will be low. If two ridge count sequences generated in the same fingerprint image are compared, the frequency of displaying the diagonal direction sequential 0 column of the specific length will appear high and the similarity scores will appear also high. On the other hand, the predetermined reference and policy may be previously determined for the number of the diagonal direction sequential 0 columns of the similarity score or the specific length.

The controller 120 may record the result for the similarity matching performed in the step (S630) to the memory and may report the matching result to the user (S640).

As above-described, according to an exemplary embodiment of the present invention, since the ridge count sequence is used, the information that is not changed in phase on the fingerprint image may be extracted even for changes such as a rotation and a transition of the fingerprint image. Accordingly, an alignment function may be provided and the fingerprint recognition may be efficiently performed even for the change of the fingerprint image.

While this invention has been described in connection with what is presently considered to be a practical exemplary embodiment, it is to be understood that the invention is not limited to the disclosed embodiment, but, on the contrary, is intended to cover various modifications and equivalent arrangements included within the spirit and scope of the appended claims.

What is claimed is:

1. A method for performing fingerprint recognition by using a fingerprint image scanned by a fingerprint recognition apparatus, the method comprising:
   extracting a plurality of fingerprint feature points in the fingerprint image;
   determining a predetermined group among the plurality of fingerprint feature points;
   calculating a ridge number between first fingerprint feature points included in the group;
   generating a ridge count sequence by using the ridge number; and
   performing authentication by using the ridge count sequence,
   wherein the performing of the authentication includes:
      performing the authentication by comparing a registration ridge count sequence generated in a fingerprint registration process and an authentication ridge count sequence generated in the authentication process.

2. The method of claim 1, wherein
the calculating includes:
setting a reference fingerprint feature point as a reference among the first fingerprint feature points; and
calculating a ridge number between the reference fingerprint feature point and each of the first fingerprint feature points.

3. The method of claim 2, wherein
the generating includes
generating the ridge count sequence between the reference fingerprint feature point and the first fingerprint feature points, by arranging the ridge numbers calculated in a predetermined direction.

4. The method of claim 1, wherein
the performing of the authentication includes:
disposing the registration ridge count sequence in a first direction on a matrix;
disposing the authentication ridge count sequence in a second direction on the matrix;
calculating a value difference of the registration ridge count sequence and the authentication ridge count sequence; and
calculating a score of a similarity by using a characteristic on which the value difference is disposed on the matrix.

5. The method of claim 4, wherein
the calculating of the score of the similarity includes calculating the score of the similarity by using the characteristic that the value difference of 0 is continuously disposed in a diagonal on the matrix.

6. The method of claim 1, wherein
the plurality of fingerprint feature points include one or both of an ending point of a ridge and a bifurcation point of a ridge.

7. An apparatus for fingerprint recognition, comprising:
a scan unit scanning a fingerprint of a target to be recognized to generate a fingerprint image; and
a controller extracting a plurality of fingerprint feature points from the fingerprint image, calculating a ridge number between the plurality of fingerprint feature points, and generating a ridge count sequence by using the ridge number,
wherein the fingerprint image includes a registration fingerprint image scanned in a fingerprint registration process and an authentication fingerprint image scanned in an authentication process, and
wherein the controller performs authentication by comparing a registration ridge count sequence corresponding to the registration fingerprint image with an authentication ridge count sequence corresponding to the authentication fingerprint image.

8. The apparatus for the fingerprint recognition of claim 7, wherein
the controller predetermines a reference fingerprint feature point as a reference among the plurality of fingerprint feature points, and calculates a ridge number between the reference fingerprint feature point and each of the plurality of fingerprint feature points.

9. The apparatus for the fingerprint recognition of claim 8, wherein
the controller arranges the ridge numbers calculated in a predetermined direction between the reference fingerprint feature point and the plurality of fingerprint feature points to generate the ridge count sequence.

10. The apparatus for the fingerprint recognition of claim 7, wherein
the controller disposes the registration ridge count sequence and the authentication ridge count sequence in different directions on a matrix, calculates a value difference of the registration ridge count sequence and the authentication ridge count sequence, and performs the authentication by using a characteristic that the value difference is disposed on the matrix.

11. The apparatus for the fingerprint recognition of claim 9, wherein
the plurality of fingerprint feature points include one or both of an ending point of a ridge and a bifurcation point of a ridge, and the predetermined direction is a clockwise direction or a counterclockwise direction.

* * * * *